(12) United States Patent
Tanaka

(10) Patent No.: US 8,702,280 B2
(45) Date of Patent: Apr. 22, 2014

(54) LIGHT SOURCE DEVICE

(75) Inventor: Masahiko Tanaka, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 6 days.

(21) Appl. No.: 13/517,852

(22) Filed: Jun. 14, 2012

(65) Prior Publication Data

US 2012/0320599 A1 Dec. 20, 2012

(30) Foreign Application Priority Data

Jun. 15, 2011 (JP) ................................ 2011-133419

(51) Int. Cl.
*F21V 7/00* (2006.01)

(52) U.S. Cl.
USPC ...... 362/296.01; 362/297; 362/302; 362/304; 362/551; 362/560

(58) Field of Classification Search
USPC ............ 362/551, 555, 560, 296.01, 297, 302, 362/304
See application file for complete search history.

(56) References Cited

U.S. PATENT DOCUMENTS

| | | | | |
|---|---|---|---|---|
| 7,134,768 | B2 * | 11/2006 | Suzuki | 362/241 |
| 7,327,929 | B2 * | 2/2008 | Chien et al. | 385/146 |
| 2003/0137644 | A1 * | 7/2003 | Tanaka et al. | 355/67 |
| 2005/0152141 | A1 * | 7/2005 | Suzuki | 362/241 |
| 2012/0081920 | A1 * | 4/2012 | Ie et al. | 362/609 |
| 2013/0094238 | A1 * | 4/2013 | Huang et al. | 362/555 |

FOREIGN PATENT DOCUMENTS

| | | |
|---|---|---|
| JP | 11-266340 | 9/1999 |
| JP | 2002-185708 | 6/2002 |
| JP | 2008-28617 | 2/2008 |
| JP | 2008-271009 | 11/2008 |

OTHER PUBLICATIONS

Notification of Reasons for Refusal mailed Oct. 1, 2013, directed to JP Application No. 2011-133419; 4 pages.

* cited by examiner

*Primary Examiner* — Ali Alavi

(74) *Attorney, Agent, or Firm* — Morrison & Foerster LLP

(57) ABSTRACT

A light source device having: a light source; first and second light guides extending in a first predetermined direction to guide light in the first predetermined direction and irradiate a document with the light; and a confinement portion that confines light emitted by the light source and is connected to one end of the first light guide and one end of the second light guide, in which the light confined in the confinement portion is reflected off both first and second reflection surfaces provided in the confinement portion, and thereby travels through the first and second light guides in the first predetermined direction.

7 Claims, 4 Drawing Sheets

F I G . 1
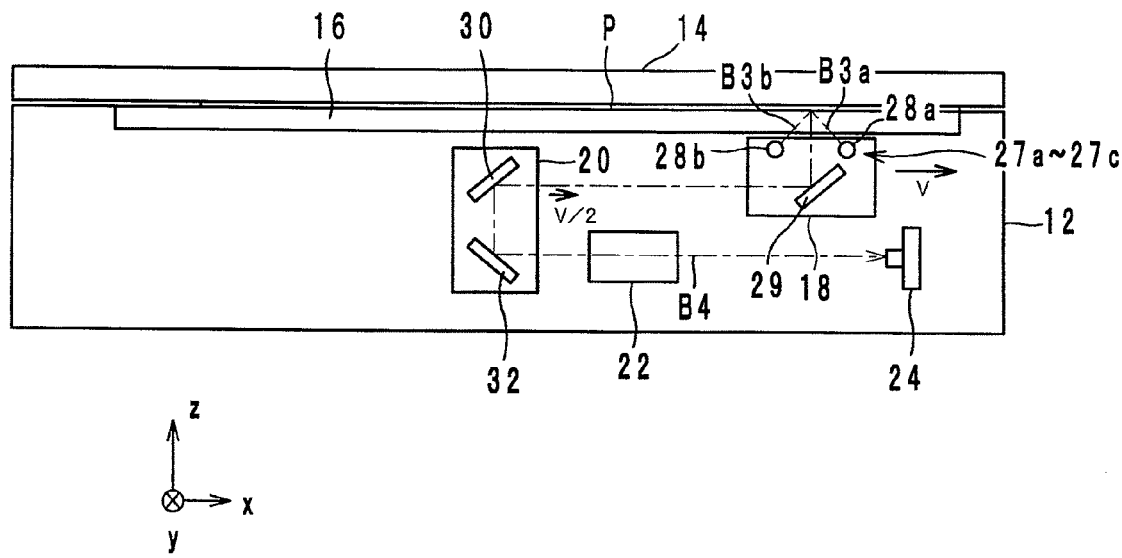
F I G . 2
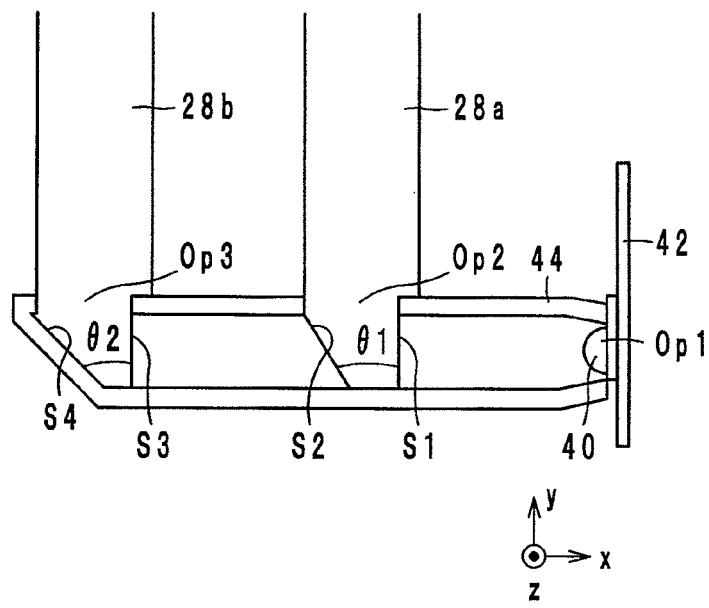

F I G . 7
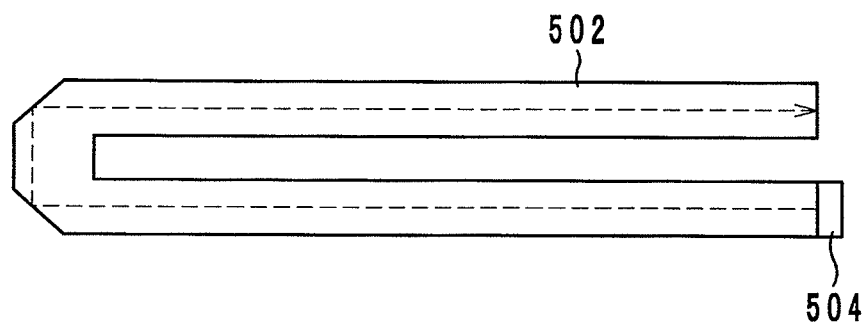

LIGHT SOURCE DEVICE

This application is based on Japanese Patent Application No. 2011-133419 filed on Jun. 15, 2011, the content of which is incorporated herein by reference.

BACKGROUND OF THE INVENTION

1. Field of the Invention

The present invention relates to light source devices, more particularly to a light source device for irradiating a document with light.

2. Description of Related Art

As a conventional light source device, for example, a lighting device described in Japanese Patent Laid-Open Publication No. 2002-185708 is known. FIG. 7 is a configuration diagram of the lighting device 500 described in Japanese Patent Laid-Open Publication No. 2002-185708.

The lighting device 500 described in Japanese Patent Laid-Open Publication No. 2002-185708 includes a light guide 502 and a light source 504. The light guide 502 is U-shaped. The light source 504 is provided at one end of the light guide 502. Light emitted by the light source 504 is guided along the U-shaped light guide 502, from one end to the other, and is also directed to a document placed on the lighting device 500. As a result, the document is irradiated with light from two directions. In the lighting device 500 as described above, the document is irradiated with light from two directions by one light source 504, so that the number of light sources 504 can be reduced, resulting in reduced production cost of the lighting device 500.

Incidentally, in the lighting device 500 described in Japanese Patent Laid-Open Publication No. 2002-185708, light emitted by one light source 504 enters from one end of the light guide 502, and is guided through the light guide 502. As a result, intensity and chromaticity vary between light emitted from around one end of the light guide 502 and light emitted from around the other end. Consequently, in an image reading apparatus using the lighting device 500, images obtained by reading documents have low color reproducibility.

SUMMARY OF THE INVENTION

A light source device according to an embodiment of the present invention includes: a light source; first and second light guides extending in a first predetermined direction to guide light in the first predetermined direction and irradiate a document with the light; and a confinement portion that confines light emitted by the light source and is connected to one end of the first light guide and one end of the second light guide, in which the light confined in the confinement portion is reflected off both first and second reflection surfaces provided in the confinement portion, and thereby travels through the first and second light guides in the first predetermined direction.

BRIEF DESCRIPTION OF THE DRAWINGS

FIG. 1 is a configuration diagram of an image reading apparatus including a light source device according to an embodiment of the present invention;

FIG. 2 is a configuration diagram of the light source device according to the embodiment of the present invention;

FIG. 7 is a configuration diagram of a lighting device described in Japanese Patent Laid-Open Publication No. 2002-185708.

DETAILED DESCRIPTION OF THE PREFERRED EMBODIMENTS

Hereinafter, an image reading apparatus including a light source device according to an embodiment of the present invention will be described.

Configuration of Image Reading Apparatus

Figure 3:
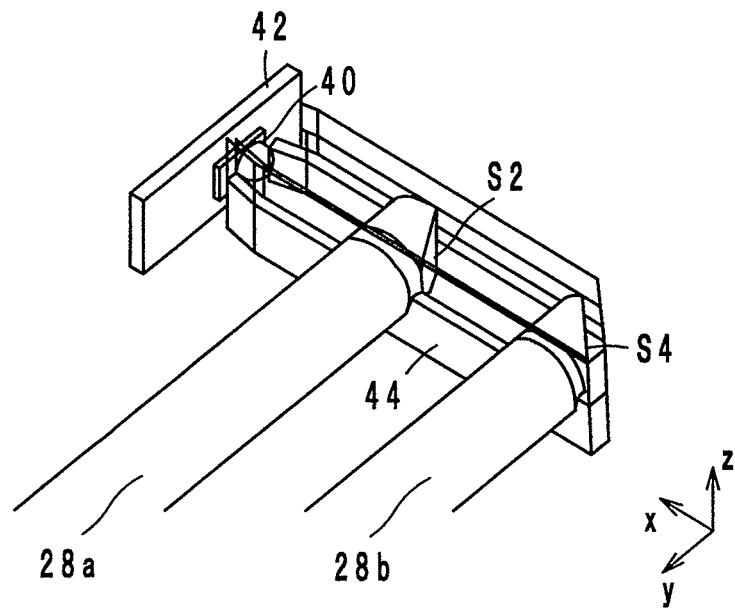
FIG. 3 is a perspective view, partially in phantom, of the light source device according to the embodiment of the present invention.

FIG. 1 is a configuration diagram of the image reading apparatus 10 including the light source device 27a according to the embodiment of the present invention. FIG. 2 is a configuration diagram of the light source device 27a according to the embodiment of the present invention. FIG. 3 is a perspective view, partially in phantom, of the light source device 27a according to the embodiment of the present invention. In the following, the vertical direction is defined as a z-axis direction, and the moving direction of slider units 18 and 20 (i.e., a sub-scanning direction) is defined as an x-axis direction. Moreover, a direction perpendicular to the x-axis direction and the z-axis direction (i.e., a main scanning direction) is defined as a y-axis direction.

The image reading apparatus 10 includes a main unit 12, a document cover 14, a platen glass 16, the slider units 18 and 20, an imaging lens 22, an image pickup device 24, the light source device 27a, and mirrors 29, 30, and 32, as shown in FIG. 1.

The main unit 12 is a rectangular parallelepiped housing in which the document cover 14, the platen glass 16, the slider units 18 and 20, the imaging lens 22, the image pickup device 24, the light source device 27a, and the mirrors 29, 30, and 32 are provided. The platen glass 16 is a rectangular, transparent plate attached to an opening provided on the positive z-axis direction side of the main unit 12. A document P is placed on the top surface of the platen glass 16, with its reading surface directed in the negative z-axis direction.

The document cover 14 is placed over the document P, as shown in FIG. 1, thereby functioning to cause the document P to closely contact the platen glass 16.

The light source device 27a is operable to irradiate the document P with beams B3a and B3b from two directions, and includes light guides 28a and 28b, an LED 40, a board 42, and a housing (confinement portion) 44, as shown in FIG. 2. The LED 40 is a semiconductor device that emits a white beam (hereinafter, referred to as a beam B1). The board 42 is a circuit board including circuitry for driving the LED 40. The LED 40 is mounted on a principal surface of the board 42 that is on the negative x-axis direction side.

The housing 44 is a rectangular parallelepiped hollow container with its longitudinal direction in the x-axis direction, as shown in FIG. 3. The housing 44 has an opening Op1 provided therein, as shown in FIG. 2. The opening Op1 is provided in a surface on the positive x-axis direction side. The LED 40 is provided in the opening Op1. As a result, the beam B1 emitted by the LED 40 enters the housing 44 through the opening Op1, and travels through the housing 44 in the negative x-axis direction.

The housing 44 has its inner circumferential surface subjected to specular finish processing or processed with white paint or suchlike to be highly reflective. Thus, the housing 44 reflects the beam B1 emitted by the LED 40 off the inner circumferential surface, thereby confining the beam inside.

Furthermore, the housing 44 has openings Op2 and Op3 provided therein, as shown in FIG. 2. The openings Op2 and Op3 are provided in a surface on the positive y-axis direction side so as to be arranged in this order from the positive to the negative x-axis direction side. The openings Op2 and Op3 respectively have the light guides 28a and 28b, to be described later, inserted therein. Specifically, an end of the light guide 28a on the negative y-axis direction side and an end of the light guide 28b on the negative y-axis direction side are connected to the housing 44. Thus, the housing 44 outputs the confined beam B1 to be branched out into the light guides 28a and 28b.

The light guides 28a and 28b are transparent resin members in the form of cylinders extending in the y-axis direction, and arranged in this order in the negative x-axis direction.

The end of the light guide 28a on the negative y-axis direction side is inserted in the opening Op2 of the housing 44. Moreover, the light guide 28a has an entry surface S1 and a reflection surface S2 provided at the end in the negative y-axis direction. Accordingly, the entry surface S1 and the reflection surface S2 are inside the housing 44. The entry surface S1 is a plane facing the LED 40 in the positive x-axis direction so as to be perpendicular to the x-axis. The beam B1 confined within the housing 44 enters the light guide 28a via the entry surface S1. Hereinafter, the beam that entered the light guide 28a will be referred to as the beam B2a.

Figure 4:
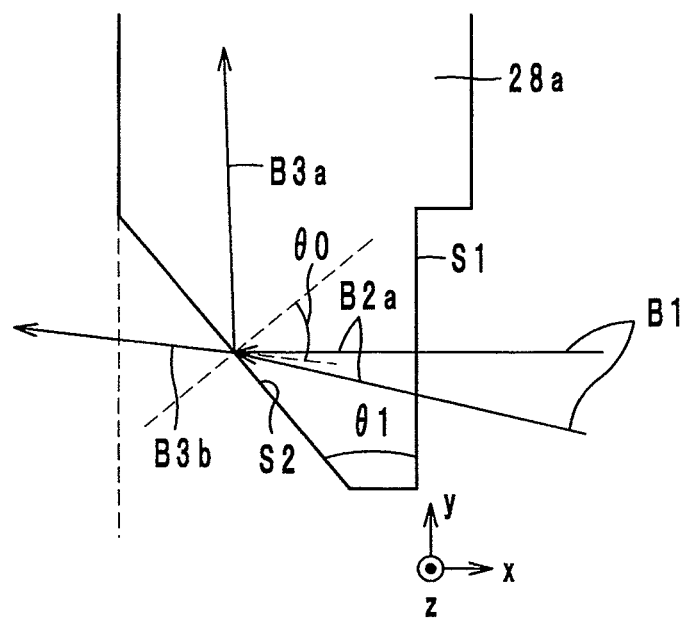
FIG. 4 is an enlarged view of a vicinity of an entry surface and a reflection surface.

The reflection surface S2 is a plane inclined in the x-axis direction. The reflection surface S2 reflects part (hereinafter, a beam B3a) of the beam B2a, which entered from the entry surface S1, in the positive y-axis direction. Moreover, the reflection surface S2 transmits therethrough the remainder (hereinafter, a beam B3b) of the beam B2a, which entered from the entry surface S1. Hereinafter, the reflection surface S2 will be described in more detail with reference to the drawings. FIG. 4 is an enlarged view of a vicinity of the entry surface S1 and the reflection surface S2.

The reflection surface S2 is at angle $\theta 1$ to the entry surface S1. For $\theta 1$, the positive direction is the counterclockwise direction from the y-axis as viewed from the positive z-axis direction side. For example, $\theta 1$ is set to be greater than 0 degrees but less than or equal to 45 degrees. The beam B2a is incident on the reflection surface S2. At this time, any part of the beam B2a that is incident on the reflection surface S2 at an angle of incidence greater than critical angle $\theta 0$, is totally reflected by the reflection surface S2, and travels through the light guide 28a in the positive y-axis direction as the beam B3a. On the other hand, any part of the beam B2a that is incident on the reflection surface S2 at an angle of incidence less than or equal to critical angle $\theta 0$, is refracted by the reflection surface S2, and exits the light guide 28a as the beam B3b. Critical angle $\theta 0$ is represented by $\sin \theta 0 = 1/n$ where the refractive index of the light guide is n, and the refractive index of air is 1.

The light guide 28a guides the beam B3a in the positive y-axis direction, and irradiates the document P with the beam B3a. To this end, the light guide 28a has a prism provided on the surface. The beam B3a is reflected by the prism surface of the light guide 28a, changes its path to the x-axis direction to irradiate the document P, and is diffusely reflected by the reading surface of the document P. Hereinafter, the beam reflected off the document P is referred to as the beam B4.

The end of the light guide 28b on the negative y-axis direction side is inserted in the opening Op3 of the housing 44. Moreover, the light guide 28b has an entry surface S3 and a reflection surface S4 provided at the end in the negative y-axis direction. Accordingly, the entry surface S3 and the reflection surface S4 are inside the housing 44. The entry surface S3 is a plane facing the reflection surface S2 in the positive x-axis direction so as to be perpendicular to the x-axis. The beam B3b transmitted through the reflection surface S2 enters the light guide 28b via the entry surface S3.

The reflection surface S4 is inclined in the x-axis direction. The reflection surface S4 totally reflects the beam B3b that entered the entry surface S3, in the positive y-axis direction. Note that there is a slight gap between the reflection surface S4 and the housing 44, where an air space is present. Thus, the beam B3b is totally reflected off the reflection surface S4.

The light guide 28b guides the beam B3b in the positive y-axis direction, and irradiates the document P with the beam B3b. To this end, the light guide 28b has a prism provided on the surface. The beam B3b is reflected by the prism surface of the light guide 28b, changes its path to the x-axis direction to irradiate the document P, and is diffusely reflected by the reading surface of the document P. Hereinafter, the beam reflected off the document P is referred to as the beam B4.

The beam B4 reflected off the document P is further reflected in the negative x-axis direction by the mirror 29, as shown in FIG. 1. The beam B4 from the mirror 29 is reflected in the negative z-axis direction by the mirror 30. The beam B4 from the mirror 30 is reflected in the positive x-axis direction by the mirror 32.

Here, the light source device 27a and the mirror 29 are provided in the slider unit 18, as shown in FIG. 1. When the document P is being read, unillustrated moving means, such as a motor, a belt and a pulley, move the slider unit 18 along the bottom surface of the platen glass 16 at velocity V in the positive x-axis direction, as shown in FIG. 1.

Furthermore, the mirrors 30 and 32 are provided in the slider unit 20, as shown in FIG. 1. When the document P is being read, unillustrated moving means, such as a motor, a belt and a pulley, move the slider unit 20 under the bottom surface of the platen glass 16 at velocity V/2 in the positive x-axis direction, as shown in FIG. 1. Thus, the path of the beam B4 between the reading surface of the document P and the image pickup device 24 is maintained at a constant length.

The imaging lens 22 focuses an optical image obtained by the beam B4 on the image pickup device 24. The image pickup device 24 is a light receiving element for receiving the beam B4 reflected off the document P. Specifically, the image pickup device 24 is a line sensor, such as a CCD camera, which has a one-dimensional image pickup area extending in the y-axis direction and scans the optical image focused by the imaging lens 22, thereby reading the image of the document P.

In the image reading apparatus 10 thus configured, when reading the document P, the document P is irradiated with the beams B3a and B3b guided by the light guides 28a and 28b, and the beam B4 reflected off the document P is sequentially reflected by the mirrors 29, 30, and 32. The beam B4 reflected by the mirror 32 is incident on the imaging lens 22, and is focused by the imaging lens 22 to form an image on the image pickup device 24. The image pickup device 24 performs pixel-by-pixel photoelectric conversion in accordance with the intensity of the incident beam, thereby generating an image signal (RGB signal) corresponding to the document image, and outputs the generated signal to a control portion (not shown).

Effects

The light source device 27a thus configured can obtain an image with superior color reproducibility. More specifically, in the lighting device 500 described in Japanese Patent Laid-Open Publication No. 2002-185708 (see FIG. 7), a beam emitted by one light source 504 enters the light guide 502 from one end and is guided through the light guide 502. As a result, intensity and chromaticity vary between a beam emitted from around one end of the light guide 502 and a beam emitted from around the other end of the light guide 502. Consequently, in the image reading apparatus using the lighting device 500, the color reproducibility of an image obtained by reading a document is reduced.

On the other hand, in the light source device 27*a*, the housing 44 confines the beam B1 emitted by the LED 40. The beam B1 confined within the housing 44 is reflected by each of the reflection surfaces S2 and S4 provided in the housing 44, thereby traveling through the light guides 28*a* and 28*b* in the positive y-axis direction. That is, the beam B1 confined within the housing 44 is branched out into the light guides 28*a* and 28*b* by the housing 44. The beams B3*a* and B3*b* respectively emitted by the light guides 28*a* and 28*b* are approximated in terms of their intensities at this time by the reflection surfaces S2 and S4, which are designed such that the beams B3*a* and B3*b* traveling through the light guides 28*a* and 28*b* in the positive y-axis direction are approximated in terms of their intensities. The length of each of the light guides 28*a* and 28*b* is equivalent to half the length of the light guide 502, and therefore each of the differences in the intensities of the beams B3*a* and B3*b* at opposite ends of the light guides 28*a* and 28*b* is smaller than the difference in the intensities of a beam at opposite ends of the light guide 502. Thus, the image reading apparatus 10 using the light source device 27*a* is capable of obtaining an image with superior color reproducibility.

In the light source device 27*a*, angle θ1 (see FIG. 4) between the reflection surface S2 and the entry surface S1 is preferably greater than 0 degrees but less than or equal to 45 degrees, such that the lights B3*a* and B3*b* respectively emitted by the light guides 28*a* and 28*b* to irradiate the document P are equalized in intensity, as described earlier. More specifically, angle θ1 of about 48 degrees equalizes the intensity of the beam B3*a* reflected off the reflection surface S2 with the intensity of the beam B3*b* transmitted through the reflection surface S2. In this case, when the entire beam B3*b* transmitted through the reflection surface S2 travels through the light guide 28*b* in the y-axis direction, the beams B3*a* and B3*b* respectively derived from the light guides 28*a* and 28*b* to irradiate the document P are equalized in intensity.

However, part of the beam B3*b* transmitted through the reflection surface S2 leaks to the outside or is absorbed by the housing 44 and the light guide 28*b*, without traveling through the light guide 28*b* in the y-axis direction. Therefore, the intensity of the beam B3*b* transmitted through the reflection surface S2 is preferably greater than the intensity of the beam B3*a* reflected off the reflection surface S2. The present inventor carried out computer simulations, finding that the beams B3*a* and B3*b* respectively derived from the light guides 28*a* and 28*b* to irradiate the document P are equalized in intensity when angle θ1 is about 30 degrees. However, angle θ1 varies in accordance with the designs for the light guides 28*a* and 28*b* and the housing 44. Accordingly, angle θ1 is preferably greater than 0 degrees but approximately less than or equal to 45 degrees. Moreover, angle θ2 (see FIG. 2) between the reflection surface S4 and the entry surface S3 is preferably less than angle θ1, to cause more of the beam B3*b* to travel in the positive y-axis direction.

Furthermore, the light source device 27*a* has high light use efficiency. More specifically, the beam B1 emitted by the LED 40 travels in the negative x-axis direction within the housing 44. In addition, the LED 40 and the light guides 28*a* and 28*b* are arranged in this order from the positive to the negative x-axis direction side. That is, the light guides 28*a* and 28*b* are provided in the travel direction of the beam B1 emitted by the LED 40. As a result, the beam B1 can readily enter the light guides 28*a* and 28*b* even if it is not reflected by the inner circumferential surface of the housing 44. Thus, in the light source device 27*a*, loss of light due to reflection by the inner circumferential surface of the housing 44 is reduced, resulting in high light use efficiency.

Furthermore, in the light source device 27*a*, uneven illuminance distribution is inhibited from occurring at the ends of the light guides 28*a* and 28*b* on the negative y-axis direction side. More specifically, the LED 40 diffuses the beam B1. Accordingly, for the beam B1 emitted by the LED 40, stable illuminance distribution can be obtained at a position at least several millimeters [mm] away from the LED 40. Therefore, in the light source device 27*a*, the beam B1 emitted by the LED 40 is initially confined within the housing 44, and thereafter enters the light guides 28*a* and 28*b* rather than directly entering the light guides 28*a* and 28*b*. As a result, at the time of entry into the light guides 28*a* and 28*b*, the beam B1 has stable illuminance distribution. Thus, in the light source device 27*a*, uneven illuminance distribution is inhibited from occurring at the ends of the light guides 28*a* and 28*b* on the positive y-axis direction side.

First Modification

Figure 5:
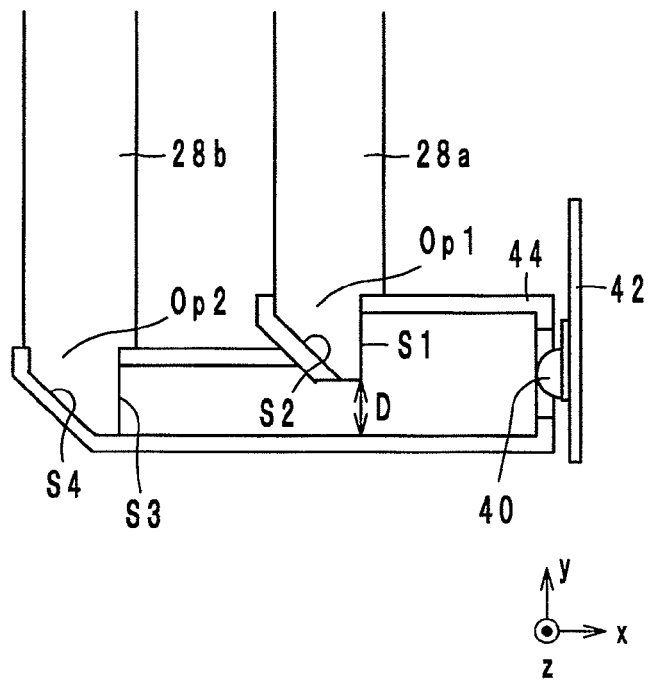
FIG. 5 is a configuration diagram of a light source device according to a first modification.

Hereinafter, a light source device according to a first modification will be described with reference to the drawings. FIG. 5 is a configuration diagram of the light source device 27*b* according to the first modification.

In the light source device 27*b*, the beam B3*b* transmitted through the reflection surface S2 does not enter the entry surface S3, but the beam B1 emitted by the LED 40 directly enters the entry surface S3. More specifically, provided at the end of the light guide 28*a* on the negative y-axis direction side are an entry surface S1 facing the LED 40 and allowing the beam B1 confined within the housing 44 to enter the light guide 28*a* and a reflection surface S2 inclined in the x-axis direction and reflecting the beam B2*a*, which entered the entry surface S1, in the positive y-axis direction as the beam B3*a*. Moreover, provided at the end of the light guide 28*b* on the negative y-axis direction side are an entry surface S3 facing the LED 40 and allowing the beam B1 confined within the housing 44 to enter the light guide 28*b* and a reflection surface S4 inclined in the x-axis direction and reflecting the beam B1, which entered the entry surface S3, in the positive y-axis direction as the beam B3*b*. The entry surface S3, in planar view in the negative x-axis direction, protrudes from the entry surface S1.

As with the light source device 27*a*, the light source device 27*b* thus configured is capable of obtaining an image with superior color reproducibility.

Note that in the light source device 27*b*, the entry surfaces S1 and S3 are preferably designed such that the beams B3*a* and B3*b* respectively derived from the light guides 28*a* and 28*b* to irradiate the document P are equalized in intensity. In the present embodiment, the entry surface S3, in planar view in the x-axis direction, protrudes from the entry surface S1 more than half of its width in the y-axis direction. The present inventor carried out computer simulations, finding that the beams B3*a* and B3*b* respectively derived from the light guides 28*a* and 28*b* to irradiate the document P are equalized in intensity where the entry surfaces S1 and S3 are 4 mm wide in the y-axis direction and gap D between the end of the entry surface S1 on the negative y-axis direction side and the housing 44 is 3 mm.

Further still, as with the light source device 27a, the light source device 27b has high light use efficiency.

Further yet, as with the light source device 27a, the light source device 27b inhibits uneven illuminance distribution from occurring at the ends of the light guides 28a and 28b on the positive y-axis direction side.

Second Modification

Figure 6:
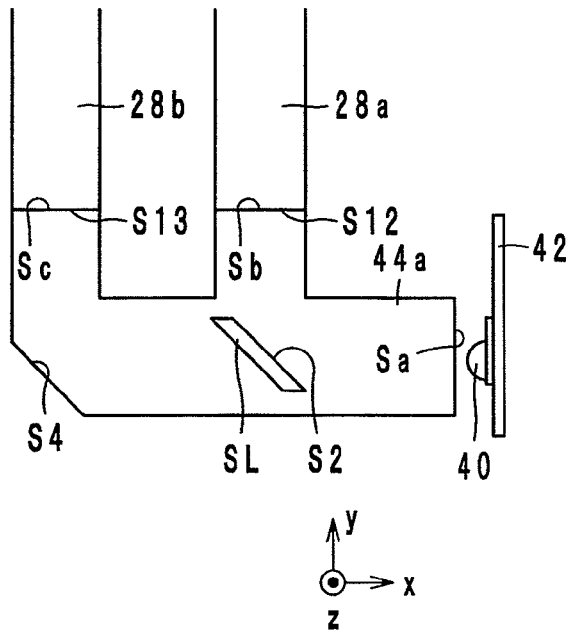
FIG. 6 is a configuration diagram of a light source device according to a second modification.

A light source device according to a second modification will be described below with reference to the drawings. FIG. 6 is a configuration diagram of the light source device 27c according to the second modification.

In the light source device 27c, a light-guiding member 44a made of transparent resin, such as polymethyl methacrylate (PMMA), is used as a confinement member in place of the hollow housing 44. The light-guiding member 44a has an entry surface Sa from which the beam B1 emitted by the LED 40 enters, an output surface Sb from which the beam B3a is outputted to an end surface S12 of the light guide 28a on the negative y-axis direction side, and an output surface Sc from which the beam B3b is outputted to an end surface S13 of the light guide 28b on the negative y-axis direction side. After entering the entry surface Sa, the beam B1 repeats total reflection at the interface of the light-guiding member 44a and air around the light-guiding member 44a, so that the beam B1 is confined within the light-guiding member 44a.

Furthermore, the light-guiding member 44a has reflection surfaces S2 and S4. The reflection surface S2 is a surface of a slit SL on the positive x-axis direction side, the slit SL being formed by partially cutting away the light-guiding member 44a. The slit SL is positioned in the negative x-axis direction from the entry surface Sa and in the negative y-axis direction from the output surface Sb. The reflection surface S2 reflects part of the light B1 in the positive y-axis direction, and transmits the remainder of the light B1 therethrough. The light reflected off the reflection surface S2 enters the light guide 28a via the output surface Sb and the end surface S12.

The reflection surface S4 is provided by shaping the light-guiding member 44a so as to have an external portion inclined with respect to the x-axis. The reflection surface S4 is positioned in the negative x-axis direction from the entry surface Sa and in the negative y-axis direction from the output surface Sc. The reflection surface S4 totally reflects the beam transmitted through the reflection surface S2, in the positive y-axis direction. The beam totally reflected by the reflection surface S4 enters the light guide 28b via the output surface Sc and the end surface S13.

Note that angles θ1 and θ2 made by the reflection surfaces S2 and S4 to surfaces perpendicular to the x-axis are the same as in the light source device 27a, and therefore any description thereof will be omitted.

Moreover, to prevent the light-guiding member 44a from leaking light to the outside, the outer circumferential surface of the light-guiding member 44a may be coated with a reflective material.

Furthermore, by adjusting the position of the slit SL in the y-axis direction, the intensities of the beams B3a and B3b emitted from the light guides 28a and 28b can be adjusted.

As with the light source device 27a, the light source device 27c thus configured can obtain an image with superior color reproducibility.

Moreover, as with the light source device 27a, the light source device 27c has high light use efficiency.

Furthermore, as with the light source device 27a, the light source device 27c inhibits uneven illuminance distribution from occurring at the ends of the light guides 28a and 28b on the positive y-axis direction side.

Although the present invention has been described in connection with the preferred embodiment above, it is to be noted that various changes and modifications are possible to those who are skilled in the art. Such changes and modifications are to be understood as being within the scope of the invention.

What is claimed is:

1. A light source device comprising:
a light source;
first and second light guides extending in a first predetermined direction to guide light in the first predetermined direction and irradiate a document with the light; and
a confinement portion that confines light emitted by the light source and is connected to one end of the first light guide and one end of the second light guide, wherein,
the light confined in the confinement portion is reflected off both first and second reflection surfaces provided in the confinement portion, and thereby travels through the first and second light guides in the first predetermined direction.

2. The light source device according to claim 1, wherein,
the light emitted by the light source travels within the confinement portion in a second predetermined direction perpendicular to the first predetermined direction, and
the light source, the first light guide and the second light guide are arranged in this order in the second predetermined direction.

3. The light source device according to claim 2, wherein,
the confinement portion is a housing that reflects light off an inner circumferential surface and thereby confines the light,
provided at one end of the first light guide are a first entry surface, which faces the light source and from which the light confined within the confinement portion enters the first light guide, and the first reflection surface, which is inclined in the second predetermined direction, partially reflects the light from the first entry surface, in the first predetermined direction, and transmits therethrough the remainder of the light from the first entry surface, and
provided at one end of the second light guide are a second entry surface, which faces the light source and from which the light transmitted through the first reflection surface enters the second light guide, and the second reflection surface, which is inclined in the second predetermined direction and totally reflects the light from the second entry surface, in the first predetermined direction.

4. The light source device according to claim 3, wherein the first reflection surface makes an angle greater than 0 degrees but less than or equal to 45 degrees to the first entry surface.

5. The light source device according to claim 2, wherein,
the confinement portion is a resin member having an entry surface from which light emitted by the light source enters, a first output surface from which light is outputted to an end of the first light guide, and a second output surface from which light is outputted to an end of the second light guide, and
the confinement portion includes the first reflection surface and the second reflection surface.

6. The light source device according to claim 2, wherein,
the confinement portion is a housing that reflects light off an inner circumferential surface and thereby confines the light, provided at one end of the first light guide are a first entry surface, which faces the light source and from which the light confined within the confinement portion enters the first light guide, and the first reflection surface, which is inclined in the second predetermined direction and totally reflects the light from the first entry surface, in the first predetermined direction, and provided at one end of the second light guide are a second entry surface, which faces the light source and from which the light confined within the confinement portion enters the second light guide, and the second reflection surface, which is inclined in the second predetermined direction and totally reflects the light from the second entry surface, in the first predetermined direction.

7. The light source device according to claim 6, wherein the second entry surface, in planar view in the second predetermined direction, protrudes from the first entry surface.

* * * * *